US012616905B2

(12) United States Patent
     Chi et al.

(10) Patent No.: US 12,616,905 B2
(45) Date of Patent: May 5, 2026

(54) INTELLIGENT ASSISTANT FOR GAMING PERFORMANCE

(71) Applicant: Dell Products L.P., Round Rock, TX (US)

(72) Inventors: Wei-Hsiang Chi, Taipei (TW); Preeth Kartikeyan Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 18/351,352

(22) Filed: Jul. 12, 2023

(65) Prior Publication Data

US 2025/0018308 A1    Jan. 16, 2025

(51) Int. Cl.
     *A63F 13/85*     (2014.01)
     *A63F 13/285*    (2014.01)
     *A63F 13/533*    (2014.01)
     *A63F 13/798*    (2014.01)

(52) U.S. Cl.
     CPC ............ *A63F 13/85* (2014.09); *A63F 13/285* (2014.09); *A63F 13/533* (2014.09); *A63F 13/798* (2014.09)

(58) Field of Classification Search
     CPC .......... A63F 13/34; A63F 13/44; A63F 13/45; A63F 13/47; A63F 13/50; A63F 13/52; A63F 13/533; A63F 13/5375; A63F 13/55; A63F 13/56; A63F 13/58; A63F 13/67; A63F 13/70; A63F 13/79; A63F 13/85; A63F 2300/53; A63F 2300/535; A63F 2300/55; A63F 2300/554; A63F 2300/57; A63F 2300/632
     See application file for complete search history.

(56) References Cited

U.S. PATENT DOCUMENTS

| | | | | |
|---|---|---|---|---|
| 11,559,746 | B1 * | 1/2023 | Caballero | ............. A63F 13/497 |
| 2009/0088233 | A1 * | 4/2009 | O'Rourke | ............... A63F 13/30 |
| | | | | 463/7 |
| 2013/0116022 | A1 * | 5/2013 | Davison | ............... A63F 13/355 |
| | | | | 463/9 |
| 2016/0371433 | A1 * | 12/2016 | Polesskiy | ............. A63F 13/825 |
| 2019/0232168 | A1 * | 8/2019 | Benedetto | ............... A63F 13/67 |

* cited by examiner

*Primary Examiner* — Omkar A Deodhar
(74) *Attorney, Agent, or Firm* — Norton Rose Fulbright US LLP

(57)    ABSTRACT

Systems and methods for providing assistance with a user's gaming performance are disclosed. Telemetry data associated with a user is received, e.g., by an information handling system or hub device, during a gaming session for a gaming application. A gaming performance of the user is monitored during the gaming session, based, at least in part, on the telemetry data. Based on the monitoring, it may be determined that the user needs assistance with at least one portion of the gaming application. Based on the determination, a gaming assistance session is initiated to provide the assistance via at least one interface of a device associated with the user.

14 Claims, 9 Drawing Sheets

500A

Microphone
502

Fingerprint Sensor
504

Motion Sensor(s)
506

508
Temperature
Sensor

510
Moisture
Sensor

500B

Heart Rate Sensor
512

514
Antenna

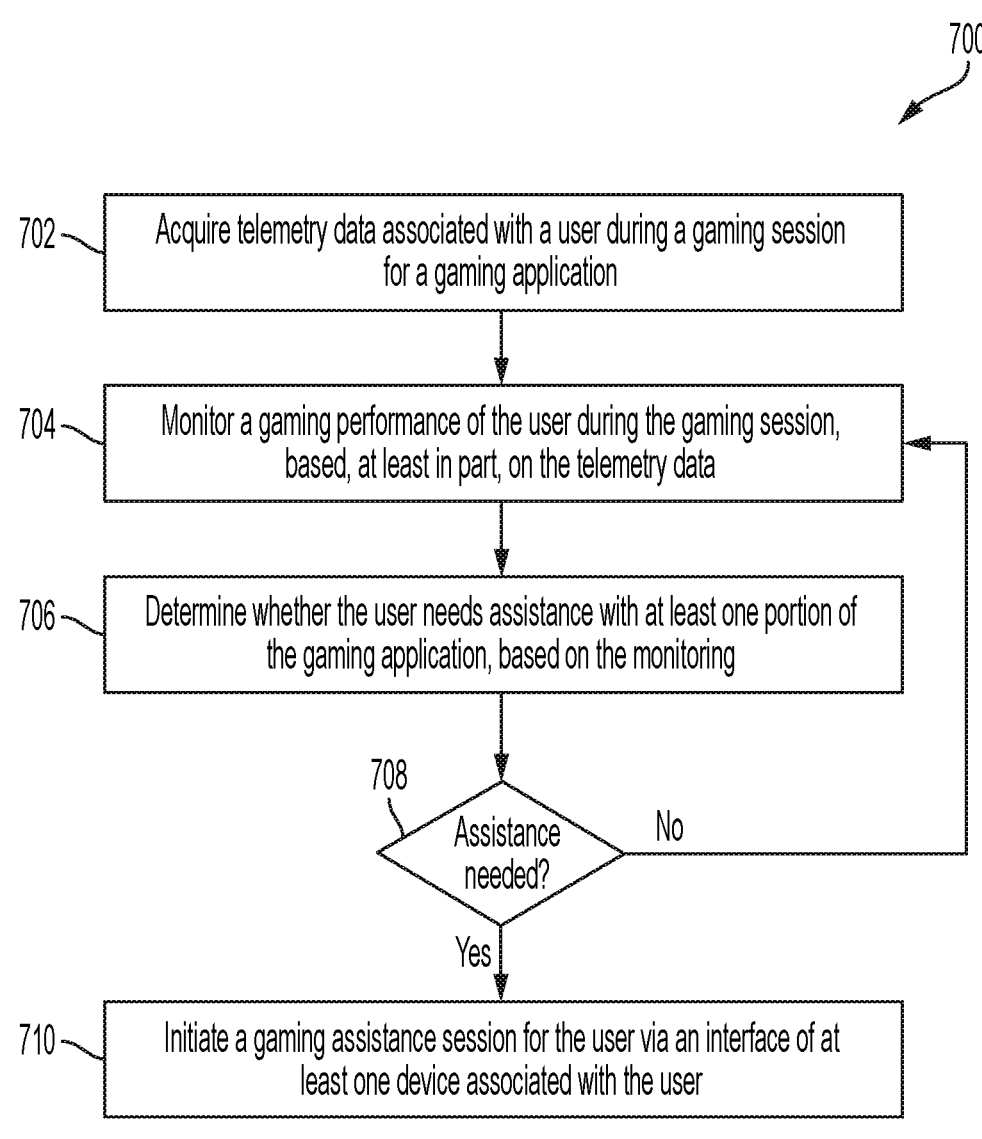

*700*

702 — Acquire telemetry data associated with a user during a gaming session for a gaming application 704 — Monitor a gaming performance of the user during the gaming session, based, at least in part, on the telemetry data 706 — Determine whether the user needs assistance with at least one portion of the gaming application, based on the monitoring 708 — Assistance needed?

No

Yes

710 — Initiate a gaming assistance session for the user via an interface of at least one device associated with the user

| Scenario | Session data | Wellness data | AI engine | Gaming performance assistance |
|---|---|---|---|---|
| 810 | Regular play hours on Friday evening | Normal excitement | AI detects that the gamer tries something new tonight but repeatedly facing a challenge on that new chapter | • Provide in-game assistance on the challenge<br>• Lighting show to recognize the gamer's acceptance of the in-game assistance<br>• After the game hours, mobile app pops up reference links on that new game to check later |
| 820 | Unusual hour | Less motion detected. Less excitement detected | Repeating the same game stage for few times with same poor performance | • Decided that no assistance needed, given the gamer seems not in a mood to improve him/herself |
| 830 | Weekend. Changing rooms but playing the same game | Frequent motion detected. High excitement | AI detects that the same challenge has been tried for few times before, though performance varies | • Decided that the gamer really likes this game and would be interested in some professional tips<br>• Prompt the gamer with short OSD tip, but further information won't be displayed until user double-click to avoid disturbance<br>• Provide controller feedback after tips are read |
| 840 | User identity is validated. Same game played multiple times | No abnormal condition observed | Optionally provide intelligent recording | • Provide video playback, slow motion, rewind, etc for gamers to revisit<br>• During revisit, intelligently remind the gamers about better route, unused weapon, new techniques, etc |

FIG. 8

INTELLIGENT ASSISTANT FOR GAMING PERFORMANCE

FIELD OF THE DISCLOSURE

The instant disclosure relates to information handling systems. More specifically, portions of this disclosure relate to an information handling system for assisting users of video game applications (or gamers) with their gaming performance.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One increasingly popular use for information handling systems is gaming. Information handling systems can be utilized by users to execute a variety of gaming applications, such as strategy games, adventure games, first person shooter games, racing games, sports games, simulation games, role playing games, platformer games and other games. Gaming applications may range in difficulty from easy to learn by a non-gamer to difficult even for veteran gamers.

Oftentimes, when a user encounters a particularly difficult segment of a game or wishes to improve their skills, the user may consult online videos, written strategy guides, forums, message boards, friends, and other information sources for tips, strategies, and other assistance related to improving their skills with respect to a particular game. Such information sources, however, may not always be available or accessible to the user when the user needs assistance during a gaming session. Moreover, such information sources may be cumbersome to review and may not be tailored to the user's specific skill level, gaming style, personality, and interests.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Information handling systems may be used to execute applications, such as gaming applications. Embodiments of this disclosure may be used to provide an information handling system, such as a hub device, which uses artificial intelligence (AI) to provide assistance with a user's gaming performance during an application session. The application session may be a gaming session of the user with a gaming application executed by the information handling system or hub device. Gaming applications may include any of various single-player or multi-player games, such as puzzle games, role playing games, adventure games, first person shooter games, sports games, simulation games, strategy games, platformer games, and other games. Such games may be hosted by the information handling system to support different types of gameplay in one or more gaming environments, such as one or more rooms of a household for gameplay in a family environment or a cloud-based gaming environment for online gameplay.

In some embodiments, the information handling system or hub device may include an intelligent gaming assistance service (e.g., an automated gaming assistant or coach) that analyzes telemetry data acquired from various sources to monitor the user's gaming performance during the gaming session and provide appropriate assistance or feedback for at least a portion of the gaming application (e.g., a difficult stage or other challenging portion of a game). The telemetry data may include, for example, session data indicating one or more gaming characteristics of the user, such as the user's level of experience or skill. For example, a skill level of the user during the gaming session may be compared with a previous skill level of the user during one or more previous gaming sessions. Alternatively, the user's skill level may be compared with an average skill level of other users having similar gaming profiles (e.g., based on age, gameplay experience, or other gaming characteristics of each user) to determine whether the user needs assistance during the current session. The telemetry data may also include wellness data indicating the user's excitement level or mood during the gaming session. The wellness data may be used to determine, for example, whether the user is in a mood that is receptive to receiving assistance during the gaming session. The wellness data may include various measurements collected during the gaming session using different sensors or measurement devices that are coupled to or integrated with a peripheral device, such as a wireless game controller, associated with the user. Such sensors may include, for example, one or more location sensors or devices (e.g., one or more of a global positioning system (GPS) for measuring geographical location or an antenna for measuring relative location using signal propagation across one or more frequency bands), one or more motion sensors (e.g., one or more of a gyroscope and an accelerometer), a heart rate sensor, a temperature sensor, a moisture sensor, a microphone, and a fingerprint sensor (for user identification).

In some embodiments, the gaming assistance service of the information handling system may include an AI engine that analyzes the telemetry data along with information relating to a gaming context of the gaming application to monitor the user's gaming performance during the gaming session and to determine whether the user needs assistance with at least a portion of the gaming application, such as a particularly challenging stage of the game. The assistance may be provided in various ways, such as through in-game assistance via an on-screen display, through an interface of a gaming companion application executable at a mobile device of the user, or through controller feedback via a haptic or lighting interface of the user's game controller or other peripheral device, or through any combination of the foregoing interfaces. The type of assistance provided to the user during the session may depend on a gaming context associated with the gaming application. The gaming context may be based on the type of gaming application (e.g., single-player vs. multi-player game) and the type of gaming environment (e.g., a family environment with gamers located in the same household vs. a cloud environment with online gamers in different remote locations). In some embodiments, the AI engine may employ a machine learning model for the data analysis and performance monitoring. The machine learning model may be trained to assess the user's gaming performance based on session history data collected over time during previous gaming sessions of the user or other users with similar gaming profiles (or both) for the gaming application. The AI engine may also incorporate user feedback to evaluate the effectiveness of the assistance and retrain the model if necessary to improve the assistance to be provided during subsequent gaming sessions based on the user's particular learning behavior and gaming performance over time.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

While embodiments of the disclosed performance assistance techniques are described in the context of users of gaming applications, it should be appreciated that these techniques may be applied to general computer users and extended to applications beyond gaming. For example, performance assistance may be provided to a user of a desktop or mobile computing device (such as a laptop) based on telemetry data acquired using various sensors embedded in or near I/O devices of the computing device (such as in a palm rest adjacent to a touchpad or keyboard of the laptop). Such sensors may include, but are not limited to, a heart rate monitor, one or more motion sensors, a camera, and a microphone. The data captured using such sensors (e.g., heart rate data) may be combined with visual and audio input data analysis techniques (such as key stroke analysis, analysis of pupil dilation, and voice modulation analysis) to gauge the user's excitement or stress levels (e.g., based on key stroke frequency, pupil dilation, and breathing patterns). This sensory data may be further combined with other personal data, such as health data accumulated with the user's consent, to determine whether the user may be having difficulty with a particular portion of an application (e.g., based on high stress levels detected during a corresponding portion of the application session) and to provide relevant feedback accordingly. The feedback may include, for example, helpful tips or suggestions (or links to online resources) pertaining to the portion of the application. Such feedback may be provided in real time during the application session, e.g., via a pop-up window displayed within a graphical user interface of the application, or via email or other messaging interface after the session. The application in this example may be an office or work-related application, such as a spreadsheet editor or meeting presentation program.

According to one embodiment of the present disclosure, a method for execution by an information handling system, such as a hub device, includes receiving, by the hub device, telemetry data associated with a user during a gaming session for a gaming application executing on the hub device. The method also includes monitoring, by the hub device, a gaming performance of the user during the gaming session, based, at least in part, on the telemetry data. The method further includes determining that the user needs assistance with at least one portion of the gaming application, based on the monitoring and initiating a gaming assistance session to provide the assistance via at least one interface of a device associated with the user, based on the determination.

In some embodiments, the telemetry data includes session data and wellness data associated with the user, where the session data is indicative of one or more gaming characteristics of the user during the gaming session, and where the wellness data is indicative of a mood of the user during the gaming session.

In some embodiments, the one or more gaming characteristics include a skill level of the user. Determining that the user needs assistance may include: determining whether the skill level of the user is below a threshold skill level associated with the at least one portion of the gaming application; determining whether the mood of the user is receptive to gaming assistance, based on the wellness data; and determining that the user needs assistance with the at least one portion of the gaming application when the skill level of the user is below the threshold skill level and the mood of the user is receptive to gaming assistance. In some implementations, the threshold skill level is based on an average skill level of others users with respect to the at least one portion of the gaming application.

In some embodiments, the at least one interface of the device associated with the user includes a display interface of a display device coupled to the hub device. Initiating the gaming assistance session may include: displaying a prompt via the display interface of the display device, the prompt requesting confirmation that the user needs the assistance during the gaming session; receiving a response to the prompt from the device of the user; and initiating the gaming assistance session as an in-game assistance session via the display interface when the response includes the requested confirmation.

In some embodiments, the at least one interface of the device associated with the user further includes a haptic interface of a peripheral device coupled to the hub device. Initiating the gaming assistance session may further include triggering haptic feedback via the haptic interface of the peripheral device based on the received response. In some implementations, the peripheral device is a wireless game controller coupled to the hub device.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 7 is a flow diagram of an example method for providing assistance with a user's gaming performance during a gaming session of a gaming application according to some embodiments of the disclosure.

FIG. 8 is a table including different examples of scenarios for providing assistance with a user's gaming performance based on telemetry data received for the user during a gaming session according to some embodiments of the disclosure.

DETAILED DESCRIPTION

Figure 1:
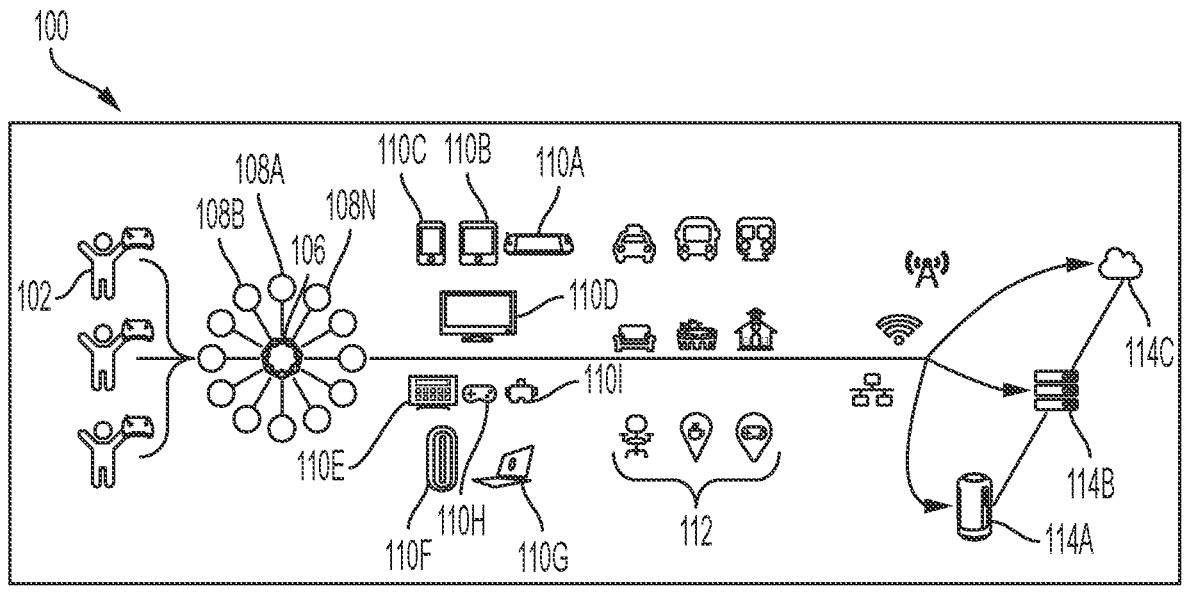
FIG. 1 is a block diagram illustrating aspects of a configurable system for providing various services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system or hub device may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, handheld gaming system, console gaming system, hybrid gaming system, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

In some implementations, an application session, such as a gaming session of a gaming application, may execute on a service, either locally on a device, on another system on a network, or in the cloud. A device, such as one of devices 110A-I, may access the application session by executing an application that communicates with the service to receive and transmit user input to the service and provide feedback to the user from the service. It is noted that a portion (or entirety) of an application session for a multi-player gaming application accessed by a device associated with a user may be referred to as "a user session." The device may include its own audio/visual (AV) output for displaying a graphical user interface and/or a rendered display from the application session. Different environments at a location may include different AV systems, and the device may be automatically paired with an AV system and may be reconfigured to support interaction with an application session using the paired AV system.

Figure 2:
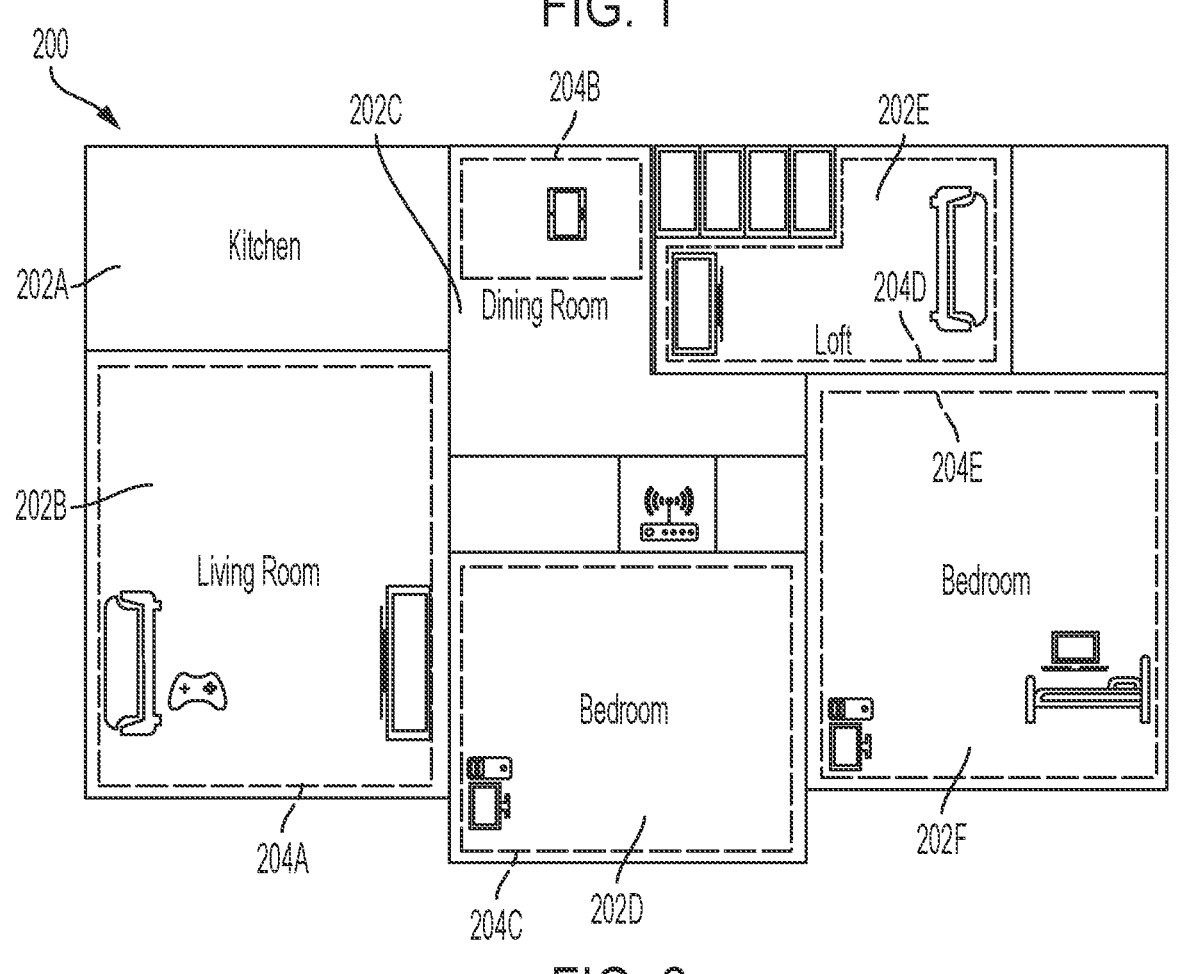
FIG. 2 is a block diagram illustrating possible gaming environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session (e.g., a user session associated with each user). In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
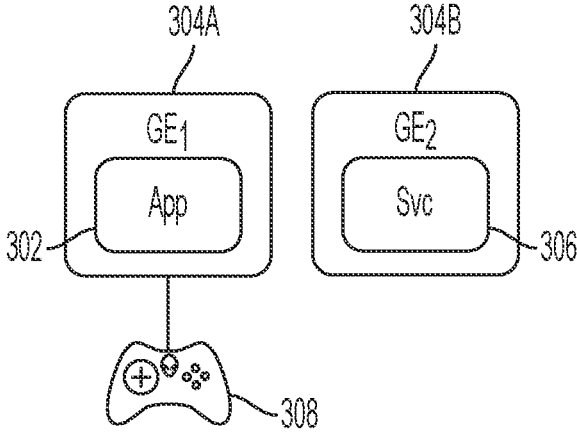
FIG. 3A is a block diagram illustrating an arrangement of applications and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session, such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
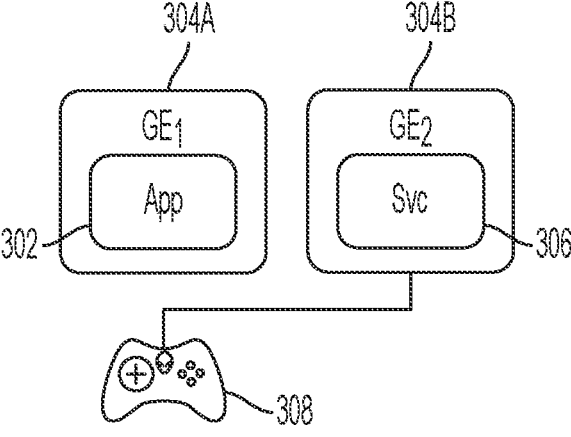
FIG. 3B is a block diagram illustrating another arrangement of applications and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
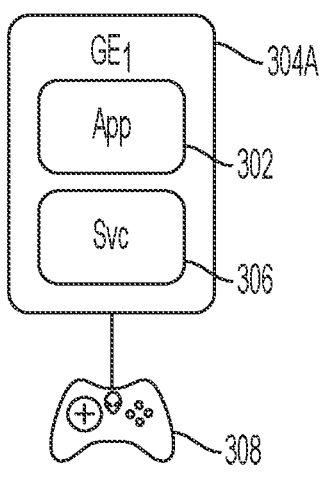
FIG. 3C is a block diagram illustrating an arrangement of applications and services hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
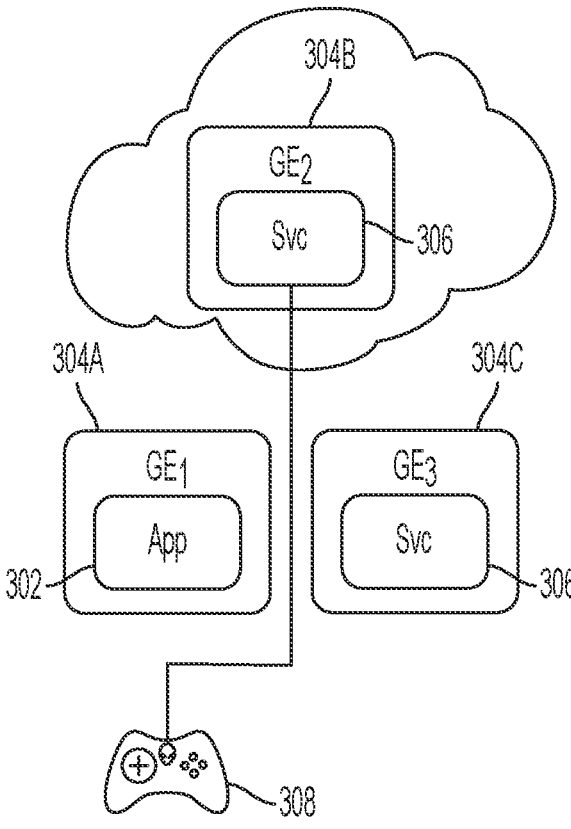
FIG. 3D is a block diagram illustrating a cloud-based service arrangement of a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, even though the user's home includes a gaming environment 304C in which the service 306 may be executed, when the user is engaging with the application 302 at a location on a different network from their home (e.g., at a friend's house). The service 306 may also or alternatively be executed, for example, on a cloud computing device available as a subscription service to the user.

In some embodiments, the service 306 may be used to monitor the gaming performance of a user (or "gamer") in any of the gaming environments 304A-C of FIGS. 3A-3D described above and provide assistance based on information relating to the user's gaming characteristics during a gaming session (e.g., a user session) of the application 302 (e.g., a gaming application). Such information may include telemetry data collected from various sources for the user during the session. The telemetry data may include, for example, a combination of session data and wellness data associated with the user. The session data may include gaming statistics based on user input received from the controller 308 as well as other gaming attributes or characteristics of the user, e.g., based on a gameplay history of the user with the application 302. The wellness data may include different measurements relating to the user's health or wellness, e.g., the user's heart rate, temperature, hand moisture levels, motion, etc., as collected by various sensors that are coupled to or integrated with the controller 308. In some embodiments, the telemetry data along with a gaming context associated with the application 302 may be used by the service 306 to determine whether the user needs assistance with a portion of the application 302 (e.g., a particular stage of the game with which the user is experiencing some difficulty). The service 306 may then initiate a gaming assistance session to provide intelligent assistance with the user's gaming performance via at least one interface of a device associated with the user. Additional details regarding such a gaming assistance service (or gaming assistant) will be described below with reference to the examples in FIGS. 4-8.

Figure 4:
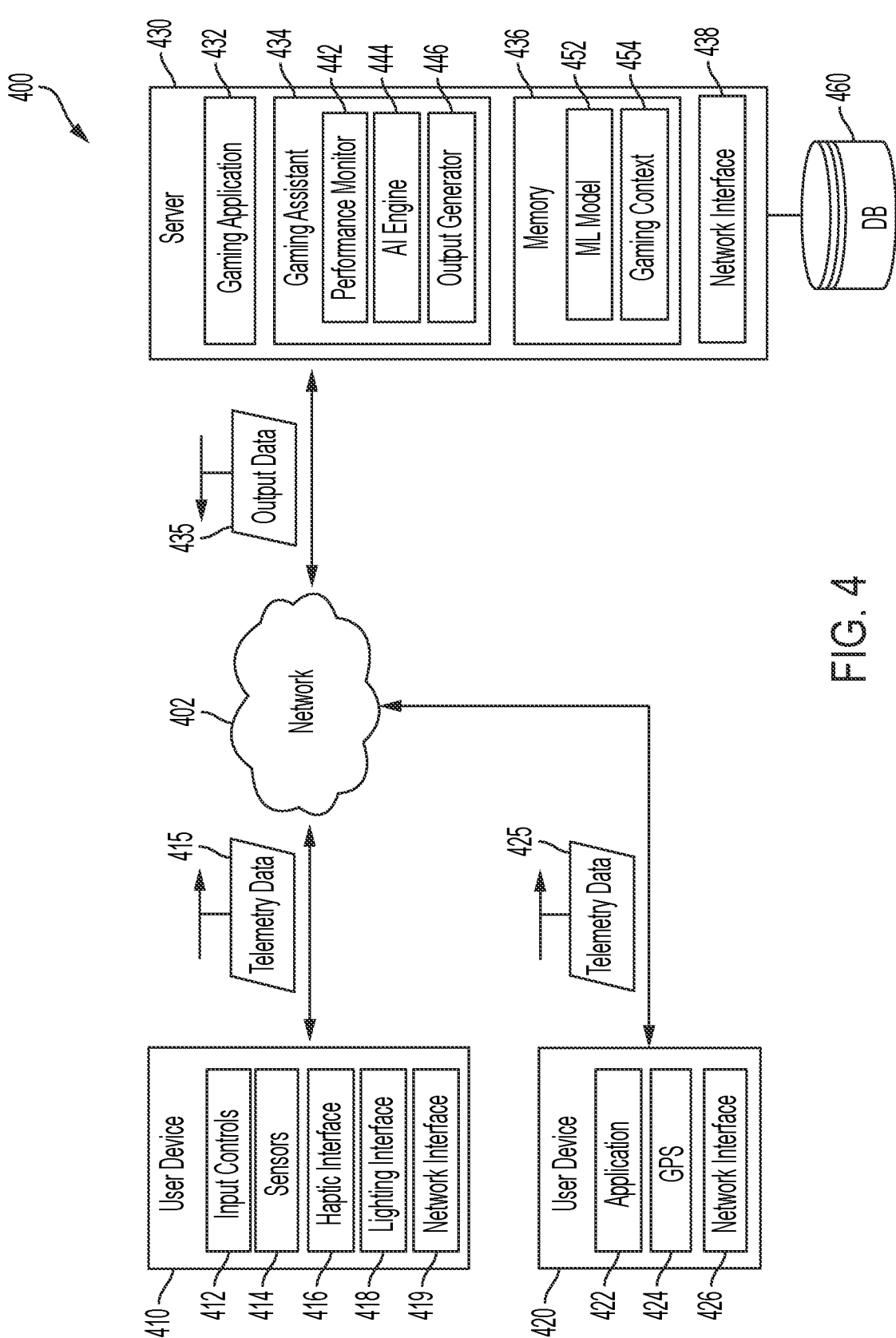
FIG. 4 is a block diagram illustrating an example of a system for providing assistance with a user's gaming performance during a gaming session of a gaming application according to some embodiments of the present disclosure.

FIG. 4 is a block diagram illustrating a system 400 for providing assistance with a user's gaming performance during an application session (or gaming session) of a gaming application according to some embodiments of the present disclosure. System 400 may include or correspond to one or more devices in system 100 of FIG. 1, as described above.

As shown in FIG. 4, system 400 includes a user device 410, a user device 420, and a server 430. Each of the user devices 410 and 420 may be communicatively coupled to the server 430 via a network 402. The network 402 may include a wired network, a wireless network, or a combination thereof. To illustrate, the network 402 may include a Bluetooth personal area network (PAN), a local area network (LAN), a wireless LAN (WLAN), a wide area network (WAN), a wireless network (e.g., a cellular network), a wired network, the Internet, one or more other networks, or a combination thereof, as illustrative, non-limiting examples. In some implementations, the network 402 may include or correspond to a wired or wireless connection between the server 430 and each of the user devices 410 and 420.

In some embodiments, system 400 may be a gaming system in which the server 430 may include or correspond to an information handling system or hub device, such as a gaming console, a desktop computer, a laptop computer, a tablet, a mobile device, a server (e.g., a cloud server), or other type of computing device for executing games or gaming applications, such as a gaming application 432. The gaming application 432 may be any of various single-player or multi-player games. Examples of such games include, but are not limited to, puzzle games, role playing games, adventure games, first person shooter games, sports games, simulation games, strategy games, platformer games, and other games. In some implementations, server 430 may be used to host an application session (e.g., a gaming session) for the gaming application 432. In some implementations, the server 430 may operate as a gaming cloud server that provides a cloud-based execution environment for gaming applications, such as the gaming application 432, of the gaming system. In some embodiments, the server 430 may include a gaming assistant 434 that operates alongside the gaming application 432 to provide assistance with a user's gaming performance during a gaming session. As will be described in further detail below, the gaming assistant 434 may be an automated gaming assistance service hosted by the server 430 that monitors the gaming performance of the user during the gaming session and provides assistance or feedback (e.g., gaming advice or tips) based on the user's gaming characteristics or behavior.

In some embodiments, the user devices 410 and 420 may be different types of peripheral devices, such as devices 110A-I of FIG. 1, associated with a user of the gaming system. Examples of different types of peripheral devices that may be associated with the user include, but are not limited to, a wired or wireless game controller (e.g., a gamepad or a joystick controller), a mouse, a keyboard, a display, a speaker, a microphone, a headset, a virtual reality (VR) device, an augmented reality (AR) device, a vehicle control simulation device (such as a racing wheel or a vehicle pedal assembly), a musical instrument simulation device (such as a guitar controller), a detachable controller, or a brain-computer interface (BCI) device, a streaming device (e.g., for streaming gaming content from the server 430), a handheld gaming device, a smartphone, and a tablet computer. Each type of peripheral device may include one or both of an input device that receives user input (such as user operation of a button or other input device) or an output device that generates an output (such as one or more of an audio output, a visual output, a haptic output, or another output).

Although the user devices 410 and 420 are illustrated in FIG. 4 as being external to the server 430, it should be appreciated that, in some implementations, one or more of these devices may be included or integrated within the server 430, for example, as part of a handheld gaming system. Also, while not shown in FIG. 4, it should be appreciated that certain output (e.g., video or audio output) generated in response to the user input may be provided to or experienced by the user via an output device (e.g., a display device or an audio speaker) that is coupled to or integrated with the server 430.

In some embodiments, the user device 410 may correspond to a first type of peripheral device, such as a wireless game controller (e.g., the game controller 110H of FIG. 1), which is communicatively coupled or paired with the server 430. In some implementations, the wireless game controller may also be coupled to or paired with one or more other information handling systems (or hub devices) corresponding to other gaming environments associated with the user (e.g., other rooms in the user's house). The user device 420 may correspond to a second type of peripheral device, such as a mobile device (e.g., the tablet computing device 110B or the phone computing device 110C of FIG. 1). In some implementations, the user device 420 (e.g., a mobile device) executes an application 422 (e.g., a mobile application) configured to communicate with the gaming application 432, which enables the user device 420 to operate as another peripheral device (e.g., a secondary controller or mobile gaming interface) for the user of the gaming system, e.g., for receiving and transmitting user input to the server 430 and/or generating an output for the user based on information received from the server 430.

Each of the user devices 410 and 420 may include a processor or other computing circuitry (e.g., a microcontroller, one or more application specific integrated circuits (ASICs), or the like) and various interfaces for input, output, and network communications with other devices (including the server 430). Each of the user devices 410 and 420 may also include a memory. The memory may include a read only memory (ROM) device, a random access memory (RAM) device, one or more hard disk drives (HDDs), a flash memory device, a solid state drives (SSDs), or any other device or combination of different devices configured to store data in a persistent or non-persistent state. In some implementations, the memory may be used to store one or more instructions, including instructions executable by the processor for a software application (such as the application 422 of the user device 420). Additionally or alternatively, the memory may be used to store one or more thresholds, data, user preferences, one or more device configurations, parameters, other device settings, or any combination of the foregoing.

In some embodiments, each of the user devices 410 and 420 may be configured to receive user input (such as from user operation of a button or other input device) and to transmit signals to the server 430 via the network 402 based on the user input. Each of the user devices 410 and 420 may also be configured to receive information (e.g., instructions or data or both) from the server 430 via the network 402 (e.g., in response to the transmitted signals) and to generate an output (such as one or more of an audio output, a visual output, a haptic output, or another output) based on the received information. Accordingly, the user devices 410 and 420 may include respective network interfaces 419 and 426 for communicating with the server 430 via the network 402. Each of the network interfaces 419 and 426 may include one or more communication interfaces, such as a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or any combination thereof.

In some embodiments, the user device 410 may further include one or more input controls 412, one or more sensors 414, a haptic interface 416, and a lighting interface 418. In some implementations, the input controls 412, the sensors 414, the haptic interface 416, and the lighting interface 418 may correspond to different input/output (I/O) interfaces for respective input and output devices of the user device 410. Such I/O interfaces may include one or more input interfaces for receiving user input based on the user's physical interaction with the one or more input controls 412.

The input controls 412 may include, for example, one or more depressible buttons, triggers, thumbsticks, scroll wheels, directional pads, touchscreens or touchpads, microphones, and other types of input controls that may be coupled to or integrated within the user device 410. The user device 410 may also include additional input interfaces for receiving sensor input (or measurements) from the one or more sensors 414. The one or more sensors 414 may include various sensors or measurement devices for collecting different types of wellness data associated with the user. Such sensors may be coupled to or integrated with the user device 410 (e.g., a game controller), as shown in FIGS. 5A and 5B.

Figure 5A:
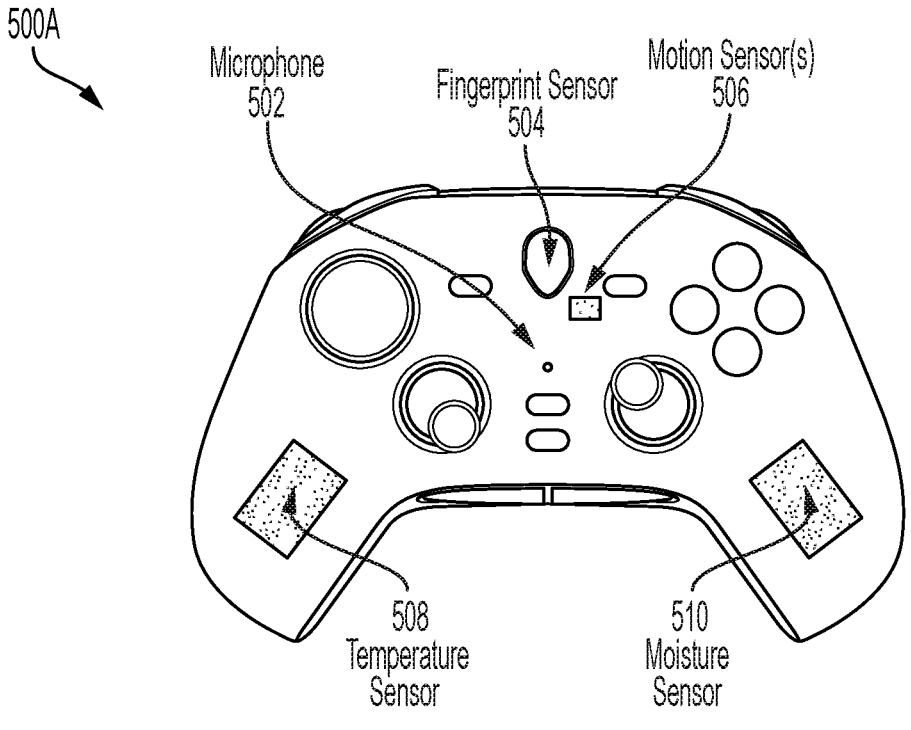
FIG. 5A is a diagram illustrating a view of a game controller including various sensors for collecting wellness data associated with a user during a gaming session according to some embodiments of the disclosure.
Figure 5B:
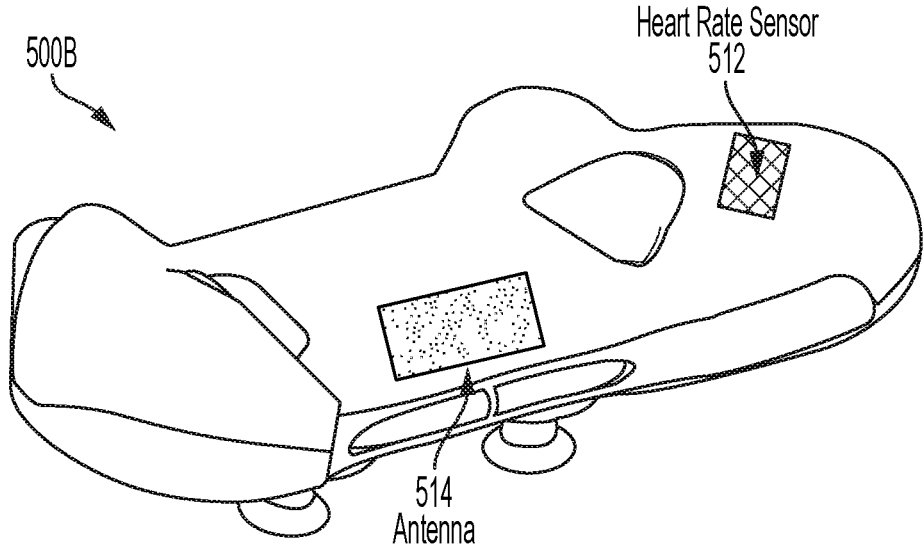
FIG. 5B is a diagram illustrating another view of the game controller of FIG. 5A with additional sensors for collecting additional wellness data associated with the user according to some embodiments of the disclosure.

FIG. 5A is a diagram illustrating a top view 500A of a game controller including various sensors for collecting wellness data associated with a user during a gaming session according to some embodiments of the disclosure. As shown in the example of FIG. 5A, the sensors of the game controller may include, but are not limited to, a microphone 502, a fingerprint sensor 504, one or more motion sensors 506, a temperature sensor 508, and a moisture sensor 510. Each sensor may be strategically placed in a location on the game controller that maximizes some performance or measurement criteria (e.g., based on the type of sensor) while satisfying one or more design constraints. For example, the microphone 502 may be placed in a central location on the game controller that is away from user input devices (e.g., buttons, thumbsticks, touchpads, etc.), and thus, less likely to be obstructed by the user's hands, to maximize a sound reception performance of the microphone 502.

The microphone 502 may be used to capture sounds (e.g., voice data for the user or other users in the user's vicinity) during the gaming session. The fingerprint sensor 504 may be used to scan the user's fingerprint, and the corresponding fingerprint data may be transmitted to an information handling system or hub device (e.g., the server 430 of FIG. 4) for purposes of user identification or account registration. In some implementations, the voice data from the microphone 502 may also be used (e.g., together with the fingerprint data from the fingerprint sensor 504) to identify the user before or during the gaming session. The motion sensor(s) 506 may be used to detect a motion of the user during the gaming session. In some implementations, the motion sensor(s) 506 may include an accelerometer or a gyroscope (or a combination of both) to detect and measure the frequency and/or direction of the user's motion during the gaming session. The temperature sensor 508 and the moisture sensor 510 may be used to measure the user's hand temperature and moisture levels, respectively, during the gaming session.

In some embodiments, the condition of the user's hand, as indicated by the measurements from the temperature sensor 508 and the moisture sensor 510, may serve as a proxy for the user's overall health or wellness level during the gaming session. Additionally or alternatively, the measurements of the user's hand temperature and moisture levels may be correlated with additional wellness data collected by one or more other sensors (e.g., motion data collected by the motion sensor(s) 506) to determine a mood or an excitement level of the user at the time the data was collected. For example, measurements indicating relatively low hand temperature and moisture levels for the user with little to no motion detected may correspond to a low excitement level. By contrast, a relatively high hand temperature and/or moisture level with frequent motion detected may indicate a high excitement level. It is assumed for purposes of this example that the user's motion, temperature, and moisture are detected and/or measured while the user is holding or operating the game controller.

In addition to the sensors shown in FIG. 5A, the game controller may include other sensors or measurement devices for collecting additional wellness data associated with the user, as shown in FIG. 5B. In FIG. 5B, a bottom view 500B of the game controller of FIG. 5A is shown with a heart rate sensor 512 and an antenna 514. The heart rate sensor 512 may be used to measure a heart rate of the user during the gaming session. In some embodiments, the heart rate measurement from the heart rate sensor 512 may be correlated with the user's hand temperature and moisture data from the respective temperature and moisture sensors 508 and 510 along with the motion data collected by the motion sensor(s) 506 to determine the user's mood or excitement level, as described above. For example, the telemetry from these different sensors may be combined to establish user-specific benchmarks for the wellness data used by the information handling system or hub device (e.g., the server 430) to gauge the user's mood or relative excitement level during the current gaming session. In some embodiments, such benchmarks may be established and/or updated for the current gaming session based on wellness data collected for the user during one or more previous gaming sessions.

In addition to or as an alternative to detecting the user's motion using the motion sensor(s) 506, the antenna 514 may be used to measure or track the user's movement within one or more gaming environments (e.g., one or more rooms of the user's home, as described above). In some implementations, the antenna 514 may be an ultra-wideband (UWB) antenna used to track a location of the user relative to the known locations of other devices within the gaming environment(s). The user's location may correspond to a location of the game controller relative to one or more reference points (e.g., UWB tags or other network devices) corresponding to the one or more gaming environments. For example, the relative location of the user within a gaming environment may be based on differences in wireless signatures or wireless signal strengths measured or detected by the antenna 514 indicating a relative distance between the user (or controller) and a corresponding reference point.

Additionally, GPS data from the user's mobile device (e.g., GPS data collected by GPS 424 of the user device 420 in FIG. 4) may reveal an absolute location of the user and/or infrared data from an infrared presence or proximity sensor may reveal that the user is sitting in front of an AV device (e.g., a device within the gaming environment for displaying a graphical user interface and/or a rendered display from the gaming session). In some embodiments, the information handling system or hub device may combine individual pieces of telemetry from different sensors or devices into a confidence-based knowledge graph of the user's gaming environments and determine a position of the user within that graph. As described above, such a knowledge graph may be based on the absolute and/or relative locations of the user's devices, the location of the user in relation to each device, and or characteristics of the respective devices. The knowledge graph and the user's location within the one or more gaming environments may be tracked and updated in real time and/or based on changes in device telemetry. For example, the knowledge graph may include information about location of rooms (e.g., environments) in the house based on wireless signatures of devices within the different rooms. The difference in signatures reflects that a peripheral device (e.g., game controller) on one side of the house may receive beacon signals from different neighboring access points than a device on an opposite side of the house. When a user carries the peripheral device around the house, the hub device may determine a location of the peripheral device (and the user) based on visible access points to the peripheral device.

Referring back to FIG. 4, the measurements collected by the sensors 414 of the user device 410 (e.g., one or more of the microphone 502, the fingerprint sensor 504, the motion sensor(s) 506, the temperature sensor 508, the moisture sensor 510, the heart rate sensor 512, and the antenna 514 of FIGS. 5A and 5B, as described above) may be transmitted to the server 430 as telemetry data 415 via the network 402. In some embodiments, the telemetry data 415 may also include session data collected by the user device 410. The session data may include, for example, input data indicating the particular input controls 412 used or operated by the user during the gaming session for the gaming application 432. In some implementations, the input controls 412 may be sorted by frequency of usage during gameplay by the user to obtain input usage statistics associated with the user for the gaming application 432. The input data generated by the input controls 412 may include, for example, the user's button selections or other input entered by the user using the input controls 412 during the gaming session.

Like the user device 410, the user device 420 may include various I/O interfaces for input, output, and network communications. In some embodiments, the user device 420 may further include the application 422 and a global positioning system (GPS) 424. As described above, GPS data collected by the GPS 424 may be combined with other telemetry data (e.g., a portion of the telemetry data 415 collected by one or more of the sensors 414 of the user device 410) to track the location of the user within one or more gaming environments.

As described above, the application 422 executed by the user device 420 may enable the user device 420 to operate as a peripheral device for the user of the gaming system. In some implementations, the application 422 may serve as a mobile gaming companion for the gaming application 432 executed by the server 430. For example, the application 422 may be used to extend the functionality of the gaming application 432 to the user device 420. The application 422 may include a graphical user interface (GUI) that enables the user to conveniently access different features of the gaming application 432 from the user device 420. For example, the user may interact with the GUI of the application 422 to register or update the user's gaming profile or account for the gaming application 432 (or a gaming cloud service associated therewith) by entering registration information (e.g., the user's age, gender, and other relevant user info) before or during the gaming session. In addition to such account registration features, the application 422 may include gameplay features (e.g., for enabling the user device 420 to serve as a game controller or other peripheral device for the gaming session) and/or assistance notification features (e.g., for receiving gaming assistance, such as relevant gaming advice or tips, via the GUI of the application 422 or other interface, such as via email or other messaging interface, at the user device 420).

In some embodiments, the data input by the user (e.g., registration information entered by the user) via the GUI of the application 422 and/or the GPS data collected by the GPS 424 may be transmitted as telemetry data 425 from the user device 420 to the server 430 via the network 402. As will be described in further detail below, the telemetry data 415 from the user device 410 and the telemetry data 425 from the user device 420 may be analyzed by the gaming assistant 434 at the server 430 to monitor the user's gaming performance and provide assistance with at least a portion of the gaming application 432 during a gaming session. As part of the assistance provided by the gaming assistant 434, the server 430 may transmit output data 435 to the user device 410 and/or the user device 420 via the network 402. The I/O interfaces of the respective user devices 410 and 420 may also include one or more output interfaces to provide one or more outputs for the user via corresponding output devices coupled to or integrated with the user device 410 and/or the user device 420, based on the output data 435 received from the server 430. The output(s) may include, for example, an audio output via one or more speakers, a visual output via a display, a light output via one or more light sources (e.g., a light ring), a haptic output via one or more haptic or vibration devices (e.g., haptic feedback via a haptic touch-pad or a rumble motor), or any combination of the foregoing. For example, the output interfaces of the user device 410 may include the haptic interface 416 for the haptic output and the lighting interface 418 for the light output.

The server 430 may include or correspond to a computing device, e.g., computing device 114 of FIG. 1. Server 430 may include one or more processors (not shown), such as a CPU or other computing circuitry (e.g., a microcontroller, one or more ASICs, or the like) and may have one or more processing cores. Server 430 may further include a memory 436 and a network interface 438 for communicating with user device 410 and user device 420 over network 402. The processor(s), memory 436, network interface 438 and other components of server 430 may be coupled to each other via a data bus.

The memory 436 of the server 430 may include a read only memory (ROM) device, a random access memory (RAM) device, one or more hard disk drives (HDDs), a flash memory device, a solid state drives (SSDs), another devices configured to store data in a persistent or non-persistent state, or a combination of different memory devices. The memory 436 may be a computer-readable medium used to store one or more instructions, such as instructions or code for the gaming application 432 and the gaming assistant 434. To illustrate, the memory 436 may store instructions that, when executed by the processor(s) of the server 430, cause the processor(s) to perform operations relating to the gaming performance assistance techniques disclosed herein. Additionally, the memory 436 may be used to store one or more thresholds, data, preferences, other settings, or any combination thereof. In some embodiments, the memory 436 may also be used to store a machine learning (ML) model 452 and data for a gaming context 454 associated with the gaming application 432 and/or gaming session of the user.

In some implementations, such data may include session data collected for the user over multiple gaming sessions and stored in a database (DB) 460 coupled to the server 430. Such data may include the user's gameplay history, including historical information about different gaming environments (e.g., different rooms of the user's house) from which the server 430 (e.g., implemented as a hub device) may use current characteristics of at least one of the user's peripheral devices (e.g., user devices 410 and/or 420) to deduce the device's location, and thus current gaming environment of the user. In some implementations, this historical information may be stored within the DB 460 in association with a user profile or account registered to the user. The user profile or account may include the user's age, gender, and other relevant data about the user. Additionally, the DB 460 may be used to store device metadata (e.g., in associated with the user's profile), which identifies the user devices 410 and 420 and one or more application environments (such as gaming environments 204A-E of FIG. 2, gaming environments 304A-C of FIGS. 3A-3D, or a combination thereof) in which each user device was detected. The device metadata may include a unique device identifier, a device type, a device manufacturer, a device model, or any combination thereof. In some embodiments, a similar user profile may be stored for each user associated with the gaming environments (e.g., each family member or gamer who resides in the user's house).

As described above, the gaming assistant 434 executed by the server 430 may operate alongside the gaming application 432 to provide assistance with a user's gaming performance during a gaming session hosted by the server 430. The assistance may be based, at least in part, on telemetry data received by the server 430 via the network 402 and the network interface 438. The network interface 438 includes one or more communication interfaces. For example, the network interface 438 may include a LoRa interface, a Wi-Fi interface (e.g., an IEEE 802.11 interface), a cellular interface (e.g., a 4G or LTE interface, a 5G NR interface, or the like), a Bluetooth interface, a BLE interface, a Zigbee interface, a non-LoRa interface, another type of network interface, a combination thereof, or the like.

In some embodiments, the gaming assistant 434 may include a performance monitor 442, an AI engine 444, and an output generator 446. In some implementations, the gaming application 432 and/or the gaming assistant 434 (including the performance monitor 442, the AI engine 444, and the output generator 446) may be included in the processor or processing circuitry of the server 430. The performance monitor 442 may use the AI engine 444 to monitor the user's gaming performance based on the telemetry data 415 received from the user device 410 and/or the telemetry data 425 received from the user device 420 via the network 402 during the gaming session. In some embodiments, the telemetry data 415 and 425 may be aggregated and correlated by the performance monitor 442. For example, the performance monitor 442 may include a telemetry analyzer (not shown) to analyze and parse the telemetry data 415 and 425 into session data and wellness data. The session data and wellness data may then be provided to the AI engine 444. The AI engine 444 may apply this data to train the ML model 452 for further analysis and processing relating to the monitoring operations associated with the performance monitor 442.

The AI engine 444 may also use the ML model 452 to determine and select one or more appropriate options for providing assistance with the user's gaming performance. Based on the selected assistance option, the output generator 446 may initiate a gaming assistance session with an output generated in accordance with the selected assistance option. In some embodiments, the assistance options may be based on the gaming context 454 associated with the gaming application 432, as will be described in further detail below with respect to the example data flow shown in FIG. 6.

In some embodiments, the AI engine 444 may incorporate user feedback to evaluate the effectiveness of the assistance session and, if necessary, retrain the ML model 452 to improve the assistance provided during subsequent gaming sessions based on the user's gaming performance and characteristics over time. In some embodiments, the feedback may be based on a comparison of the user's gaming performance (or other gaming characteristics, such as the user's skill level) before and after the gaming assistance session.

Figure 6:
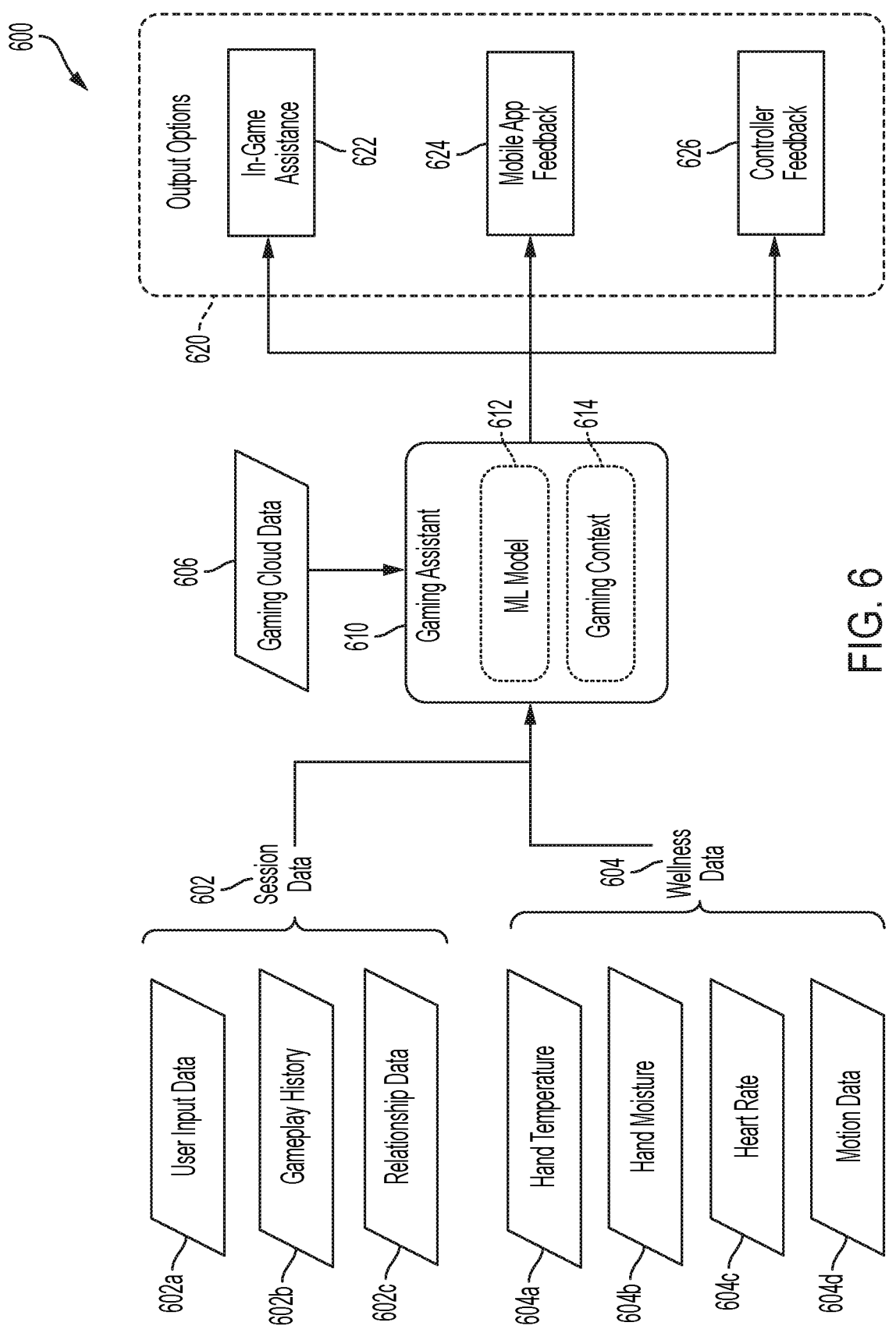
FIG. 6 is a diagram of an example data flow illustrating inputs and outputs of a gaming assistant module or service for providing assistance with a user's gaming performance during a gaming session of a gaming application according to some embodiments of the disclosure.

FIG. 6 is a diagram of an example data flow 600 illustrating inputs and outputs of a gaming assistant module or service (e.g., the gaming assistant 434 of FIG. 4) for providing assistance with a user's gaming performance during a gaming session of a gaming application (e.g., gaming application 432 of FIG. 4). As shown in FIG. 6, the inputs of a gaming assistant 610 may include session data 602, wellness data 604, and gaming cloud data 606. The outputs of the gaming assistant 610 may include various output options 620 for initiating a gaming assistance session via one or more interfaces of a device associated with the user. The gaming assistant 610 may be executed by an information handling system or hub device (e.g., the server 430 of FIG. 4) alongside the gaming application to monitor the gaming performance of the user based, at least in part, on the session data 602 and the wellness data 604 received for the user during a gaming session. In some embodiments, the session data 602 and the wellness data 604 may be received by the gaming assistant 610 at the information handling system or hub device from various data sources. Such data sources may include one or more peripheral devices associated with the user (e.g., the user device 410 and/or user device 420 of FIG. 4, as described above) and one or more data repositories, such as a local database coupled to the hub device (e.g., the DB 460 of FIG. 4) or a cloud data repository (e.g., an online data repository associated with a cloud gaming service hosted by another information handling system or a cloud computing resource). In some implementations, such a cloud data repository may be used to store gaming cloud data 606.

The session data 602 may include user input data 602*a*, gameplay history 602*b*, and household data 602*c*. The user input data 602*a* may include input data indicating the particular input controls (e.g., input controls 412 of FIG. 4) of a peripheral device (e.g., game controller) used or operated by the user during the gaming session for the gaming application. In some embodiments, the user input data 602*a* may also include user profile data (e.g., the user's age, gender, etc.) entered by the user before or during the gaming session, e.g., as part of an account registration process via a mobile application executable at the user's mobile device (e.g., via the application 422 of the user device 420, as described above). In addition to the information received from one or more devices of the user, the session data 602 may include the user's gameplay history 602*b* and household data 602*c*, which may be accessed by the information handling system or gaming assistant 610 from the local database or the cloud data repository described above. Although the gameplay history 602*b* and the household data 602*c* are shown separately from the gaming cloud data 606, it should be appreciated that, in some implementations, the gameplay history 602*b* and the household data 602*c* (or different portions thereof) may be included within the gaming cloud data 606 accessed or received from the cloud data repository, as described above.

The gameplay history 602*b* may include, for example, the user's gaming preferences, such as the user's preferred gaming time(s) (e.g., time of day, day of week, and/or other time period) and the duration of each gaming session at the corresponding time(s). Additionally, the gaming characteristics may include information that is indicative of the user's level of experience or skill, such as an amount of time the user has spent gaming, an amount of time the user has spent playing games in a particular genre, an amount of time the user has spent playing a particular game, a level of completion the user has attained in a particular game, levels of completion the user has attained in games of a particular genre, and in-game performance statistics, such as kill/death ratios, speed-run time records and other statistical data regarding the user's gaming performance obtained from the gaming application during each gaming session.

In some embodiments, the level of expertise or skill of the user may be determined based on the user's gameplay history 602*b*. For example, an amount of time spent by the user playing a particular gaming application, playing gaming applications of a particular genre, or gaming in general may be determined. Alternatively or additionally, other user gaming characteristics, such as a kill to death ratio, speed run records, a number of victories in a multiplayer gaming application, a tournament placement in a gaming competition, completion percentages of one or more gaming applications or portions of gaming applications, such as a main story or campaign, achievements obtained in one or more gaming applications, and other user gaming characteristics may be analyzed to determine a level of expertise of the user. In some embodiments, the information handling system may provide one or more goals for the user, such as a completion percentage of a gaming application, a particular number of victories in a multiplayer gaming application, a particular amount of time spent in a particular gaming application, genre of gaming applications, or gaming in general, and other goals for the user to attain to be assigned a particular level of gaming expertise.

In some implementations, the user may be assigned expert status based on the determined level of user expertise. For example, if a user has attained certain levels of gaming performance as evidenced by gaming characteristics of the user, the user may be assigned certain levels of expertise. For example, if the user has attained a certain number of victories in a multiplayer gaming application, the user may be assigned an expert status based on the number of victories. In some embodiments different levels of expert status may be assigned based on different gaming characteristics possessed by the user. For example, when a user has spent 50 hours in a gaming application, the user may be assigned a first level of expertise in the gaming application, and when the user has spent 100 hours in the gaming application, the user may be assigned a second level of expertise in the gaming application. Users may be assigned expert status for a particular gaming application, for a particular genre of gaming applications, for a particular gaming play style, such as speed running, and for gaming in general. Users that are assigned an expert status may be considered for recommendation for other users needing gaming assistance.

The household data 602*c* may include information about the size of the user's house, the location of rooms (or gaming environments) within the house, the identity of other users/ gamers (e.g., family members) who reside in the house, and any other relevant information about the relationship between the user (and the user's location) relative to that of other users and the gaming environments. As described above, such information may be based on a knowledge graph indicating the locations of various devices within each gaming environment based on differences between the wireless signatures and other characteristics of devices and/or access points associated with each environment. In some implementations, the household data 602c may include information obtained from the user profile data described above and/or the profile data associated with other related users (e.g., other members/gamers of the user's family who also reside in the house). The household data 602c may indicate, for example, if the user is playing alone within the gaming environment or if there are any other known users located nearby. The indication may be based on, for example, the recognition of another user's voice captured by a microphone coupled to or integrated with a peripheral device of the user (e.g., the microphone 502 of the game controller of FIG. 5, as described above) during the gaming session.

The wellness data 604 may include measurements relating to the user's health or wellness as collected by the one or more sensors 414 that are coupled to or integrated with the user device 410 (e.g., a game controller). The wellness data 604 may include, for example, hand temperature data 604a (e.g., as measured by the temperature sensor 508 of FIG. 5A), hand moisture data 604b (e.g., as measured by the moisture sensor 510 of FIG. 5A), heart rate data 604c (e.g., as measured by the heart rate sensor 512 of FIG. 5B), and motion data 604d (e.g., as measured by the one or more motion sensors 506 of FIG. 5A).

In some embodiments, the gaming assistant 610 (or an AI engine thereof) may use a ML model 612 to analyze the session data 602 and the wellness data 604 along with information relating to a gaming context 614 of the gaming application to monitor the user's gaming performance during the gaming session and to determine whether the user needs assistance with at least a portion of the gaming application. The session data 602 may indicate one or more gaming characteristics of the user, such as a skill level of the user, during the gaming session. The wellness data 604 may indicate an excitement level or mood of the user during the gaming session, such as whether the user in a mood that is receptive to accepting or receiving gaming assistance. For example, the gaming assistant 610 may determine that the user needs assistance with at least a portion of the gaming application during the gaming session if, for example, the analysis of the session data 602 indicates that the skill level of the user is below a threshold skill level for that portion of the gaming application and the analysis of the wellness data 604 indicates that the user is in a mood that is receptive to gaming assistance.

The gaming context 614 may indicate, for example, the type of gaming application (e.g., single-player vs. multi-player game), the gaming genre or category of the gaming application, the recommended age rating of the gaming application, and the type of gaming environment (e.g., a local gaming environment vs. an online or cloud-based gaming environment) supported by the gaming application. The gaming context 614 for the gaming application may be determined based on the gaming cloud data 606 acquired from an online or cloud data repository associated with a cloud gaming service, as described above. In some implementations, the online data repository may also serve as a resource or reference guide for relevant gaming advice, tips, or assistance information for the gaming application. that may be used to provide the in-game assistance 622 or the mobile application feedback 624. Accordingly, the gaming cloud data 606 may further include information that may be used to provide gaming assistance as an output of the analysis performed by the ML model 612.

In some embodiments, the gaming assistance may correspond to one or more output options 620. The output options 620 may include, for example, in-game assistance 622 provided via an on-screen display with assistance information superimposed on the gaming content rendered for the gaming application during the gaming session, mobile application feedback 624 provided via an interface of a mobile application executable at the user's mobile device (e.g., the user device 420), and/or controller feedback 626 provided via a haptic or lighting interface of the user's game controller or other peripheral device (e.g., via the haptic interface 416 or the lighting interface 418 of the user device 410).

FIG. 7 is a flow diagram of an example method 700 for providing assistance with a user's gaming performance during a gaming session of a gaming application according to some embodiments of the disclosure. Method 700 may be performed by an information handling system or hub device, such as the server 430 of FIG. 4, as described above.

Method 700 begins at block 702, which includes acquiring telemetry data associated with a user during a gaming session for a gaming application (e.g., the gaming application 432, as described above) executed by the information handling system. The telemetry data may include session data and wellness data associated with the user. The session data may be indicative of one or more gaming characteristics of the user, such as a skill level of the user with respect to the gaming application (or relevant portion thereof). The wellness data may be indicative of a mood of the user during the gaming session. In some embodiments, the wellness data may include sensor measurements received from a peripheral device (such as a game controller) of the user (e.g., the user device 410 of FIG. 4) during the gaming session. The peripheral device may include, for example, one or more sensors for collecting the sensor measurements. In some embodiments, the one or more sensors may include one or more of: a moisture sensor to measure hand moisture; a temperature sensor to measure hand temperature; a heart rate sensor to measure heart rate; at least one location sensor (e.g., a GPS and/or a wireless antenna) to measure a location of the user; and at least one motion sensor (e.g., an accelerometer and/or a gyroscope) to detect motion or measure a movement of the user.

At block 704, a gaming performance of the user is monitored during the gaming session, based, at least in part, on the telemetry data received at block 702. Based on this monitoring, a determination is made at block 706 as to whether the user needs assistance with at least a portion of the gaming application, such as a difficult stage or other challenging portion of the game. In some embodiments, the determination at block 706 may include determining whether a skill level of the user is below a threshold skill level associated with the at least one portion of the gaming application based on the session data, determining whether the mood of the user is receptive to gaming assistance based on the wellness data, and determining whether the user needs assistance with the at least one portion of the gaming application based on whether the skill level of the user is below the threshold skill level and the mood of the user is receptive to gaming assistance.

If it is determined at block 708 that no assistance is needed, the method 700 returns to block 704 to continue monitoring the user's gaming performance. However, if it is determined at block 708 that assistance is needed (e.g., when the skill level of the user is below the threshold skill level and the mood of the user is receptive to gaming assistance), the method 700 proceeds to block 710. At block 710, a gaming assistance session for the user is initiated via an interface of at least one device associated with the user. For example, block 710 may include initiating an in-game assistance session via an on-screen display interface associated with the gaming application. Additionally or alternatively, the gaming assistance session at block 710 may be initiated by providing gaming feedback to the user via a user interface of a mobile application (e.g., application 422 of FIG. 4) executable at a mobile device of the user (e.g., the user device 420 of FIG. 4), as described above. Additionally or alternatively, the gaming assistance session at block 710 may be initiated by triggering haptic feedback via a haptic interface of the user's peripheral device or by triggering feedback via a lighting interface of the peripheral device.

In some embodiments, the gaming performance of the user after the gaming assistance session may be assessed and feedback data from the assessment may be used to improve the assistance provided to the user during one or more subsequent gaming sessions.

FIG. 8 is a table 800 including different examples of scenarios for providing assistance with a user's gaming performance based on telemetry data received for the user during a gaming session (e.g., using method 700 of FIG. 7). The gaming session may be for a game or gaming application (e.g., gaming application 432 of FIG. 4) executed by an information handling system or hub device (e.g., system 430 of FIG. 4). In some implementations, the hub device may be part of a gaming system that includes a display device (or "gaming display") for rendering gaming content generated by the gaming application and one or more peripheral devices (e.g., the game controller of FIGS. 5A and 5B) associated with the user. As described above, the telemetry data may include session data indicating one or more gaming characteristics of the user and wellness data indicating the user's excitement level or mood for gaming and gaming assistance, e.g., whether the user is in a mood that is receptive to improving the user's gaming performance and therefore, to receiving gaming assistance during the gaming session. The session data and wellness data for the user in each scenario may be analyzed by an AI engine (e.g., the AI engine 444 of FIG. 4) of a gaming assistant (e.g., gaming assistant 434 of FIG. 4) executed by the information handling system alongside the gaming application, as described above.

As shown in FIG. 8, the first row of table 800 corresponds to a scenario 810, where the session data indicates that the current gaming session occurs at the user's regular time for playing the game (e.g., Friday evening) and the wellness data indicates that the user's level of excitement is normal. While monitoring the gaming performance of the user, the AI engine in this scenario may detect that the user is attempting to clear a new stage of the game but repeatedly fails or has difficulty with a challenging portion of the new stage. Accordingly, the gaming assistant in the scenario 810 may initiate a gaming assistance session via at least one user interface of a device in the gaming environment to provide in-game assistance relating to the challenge faced by the user.

In some implementations, the in-game assistance may be provided only after the user agrees to receive assistance. For example, the gaming assistant may first display a prompt via a display interface of a display device (e.g., a gaming display) coupled to the information handling system or hub device (e.g., the server 430 of FIG. 4). In some implementations, the prompt may be displayed in a dialog or pop-up window (e.g., as an overlay displayed with the rendered gaming content on the gaming display), which asks or requests the user to confirm that assistance is needed during the gaming session and includes selectable control buttons (marked "yes" and "no"). In response to receiving user input confirming that the user needs assistance (e.g., based on the user's selection of the button marked "yes"), the in-game assistance may be provided by the gaming assistant, for example, by providing assistance information (e.g., relevant gaming advice or tips) via an on-screen display interface of the gaming display (e.g., within the same or a different pop-up window as the prompt displayed earlier). The gaming assistant may also trigger haptic feedback via a haptic interface of a peripheral device (e.g., wireless game controller) associated with the user and/or lighting feedback via a lighting interface of the user's game controller (e.g., by triggering different light sources on the controller in a predefined pattern or sequence via the lighting interface 418 of the user device 410 shown in FIG. 4) based on the user's response (e.g., to acknowledge receiving the requested confirmation from the user). Additionally or alternatively, the gaming assistant may provide gaming feedback via a user interface of a mobile application executable at a mobile device of the user (e.g., via a GUI of the application 422 or other messaging interface at the user device 420 of FIGURE 4). The mobile gaming feedback may include, for example, one or more links to a gaming website or other online resource for later reference by the user.

In a different scenario 820 corresponding to the second row of table 800, the AI engine may determine that the user is repeating the same stage of the game without any performance improvement. However, the telemetry data received for the user may indicate that the user is not in a mood that is receptive to gaming assistance or improving the user's gaming performance. For example, the session data may indicate that the user is playing the game at an unusual hour and the wellness data may indicate that less motion is detected than usual and the user's excitement level is low. Accordingly, the AI engine may determine that no assistance is needed or wanted by the user in this scenario.

By contrast, in a scenario 830, the AI engine may determine that the user is in a mood receptive to gaming assistance based on session data that indicates that the user is playing the same game on a weekend in different gaming environments (e.g., different rooms of the user's house) and wellness data that indicates that the user's excitement level is high. In the scenario 830, the AI engine may initiate a gaming assistance session by, for example, providing a gaming feedback via an on-screen display (OSD) interface of the gaming display during the gaming session. The gaming feedback may include a gaming tip provided in a short prompt displayed with an option to view further information if the user so chooses to minimize any unwanted interruption or disturbance during the user's gaming session. Additional feedback may also be provided via an interface of the user's gaming controller (e.g., via the haptic interface 416 of the user device 410) after the user acknowledged receiving the feedback (e.g., viewing or reading the gaming tip).

In a scenario 840, the AI engine may initiate a gaming assistance session to provide gaming feedback via the OSD interface of the gaming display after verifying the user's identity using the session data for the same game played over multiple gaming sessions and the wellness data indicates a normal excitement level with no abnormal conditions. The gaming feedback in the scenario 840 may include, for example, providing a video playback of the user's gameplay recorded for the same portion or stage of the game played during a previous gaming session with playback control options (e.g., slow motion playback, rewind, fast forward, etc.) and intelligent gaming feedback relevant to that stage of the game, such as helpful tips and reminders (e.g., about a better route, any unused weapon or item, new techniques or moves, etc.).

Figure 9:
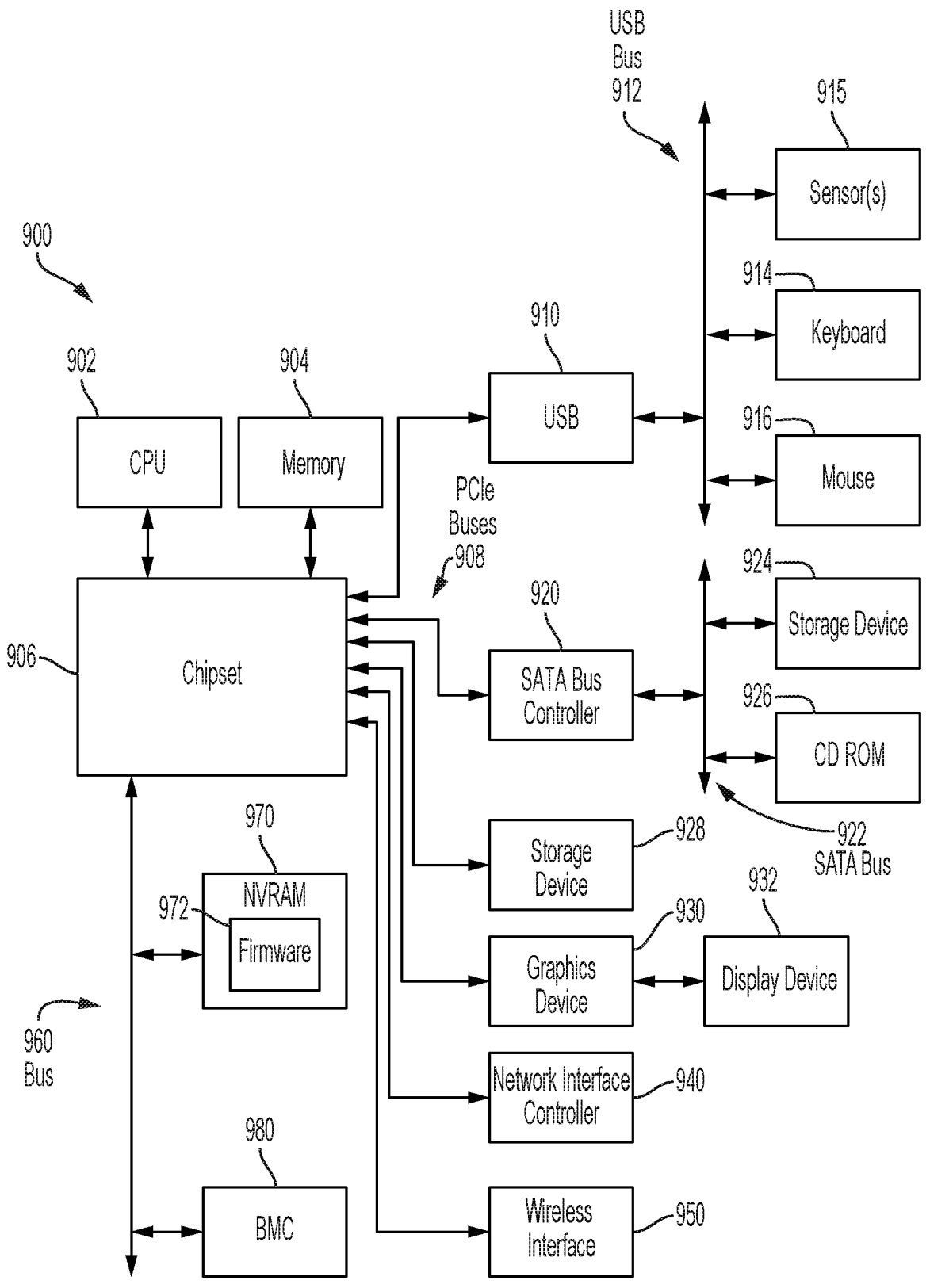
FIG. 9 is a schematic block diagram of an example information handling system according to some embodiments of the disclosure.

FIG. 9 illustrates an example information handling system 900. Information handling system 900 may include a processor 902 (e.g., a central processing unit (CPU)), a memory (e.g., a dynamic random-access memory (DRAM)) 904, and a chipset 906. In some embodiments, one or more of the processor 902, the memory 904, and the chipset 906 may be included on a motherboard (also referred to as a mainboard), which is a printed circuit board (PCB) with embedded conductors organized as transmission lines between the processor 902, the memory 904, the chipset 906, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 902, the memory 904, the chipset 906, and/or other components may be organized as a System on Chip (SoC).

The processor 902 may execute program code by accessing instructions loaded into memory 904 from a storage device, executing the instructions to operate on data also loaded into memory 904 from a storage device, and generate output data that is stored back into memory 904 or sent to another component. The processor 902 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 902 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 906 may facilitate the transfer of data between the processor 902, the memory 904, and other components. In some embodiments, chipset 906 may include two or more integrated circuits (ICs), such as a northbridge controller coupled to the processor 902, the memory 904, and a southbridge controller, with the southbridge controller coupled to the other components such as USB 910, SATA 920, and PCIe buses 908. The chipset 906 may couple to other components through one or more PCIe buses 908.

Some components may be coupled to one bus line of the PCIe buses 908, whereas some components may be coupled to more than one bus line of the PCIe buses 908. One example component is a universal serial bus (USB) controller 910, which interfaces the chipset 906 to a USB bus 912. A USB bus 912 may couple input/output components such as a keyboard 914 and a mouse 916, but also other components such as USB flash drives, or another information handling system. Another example component is a SATA bus controller 920, which couples the chipset 906 to a SATA bus 922. The SATA bus 922 may facilitate efficient transfer of data between the chipset 906 and components coupled to the chipset 906 and a storage device 924 (e.g., a hard disk drive (HDD) or solid-state disk drive (SDD)) and/or a compact disc read-only memory (CD-ROM) 926. The PCIe bus 908 may also couple the chipset 906 directly to a storage device 928 (e.g., a solid-state disk drive (SDD)). A further example of an example component is a graphics device 930 (e.g., a graphics processing unit (GPU)) for generating output to a display device 932, a network interface controller (NIC) 940, and/or a wireless interface 950 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 906 may also be coupled to a serial peripheral interface (SPI) and/or Inter-Integrated Circuit (I2C) bus 960, which couples the chipset 906 to system management components. For example, a non-volatile random-access memory (NVRAM) 970 for storing firmware 972 may be coupled to the bus 960. As another example, a controller, such as a baseboard management controller (BMC) 980, may be coupled to the chipset 906 through the bus 960. BMC 980 may be referred to as a service processor or embedded controller (EC). Capabilities and functions provided by BMC 980 may vary considerably based on the type of information handling system. For example, the term baseboard management system may be used to describe an embedded processor included at a server, while an embedded controller may be found in a consumer-level device. As disclosed herein, BMC 980 represents a processing device different from processor 902, which provides various management functions for information handling system 900. For example, an embedded controller may be responsible for power management, cooling management, and the like. An embedded controller included at a data storage system may be referred to as a storage enclosure processor or a chassis processor.

System 900 may include additional processors that are configured to provide localized or specific control functions, such as a battery management controller. Bus 960 can include one or more busses, including a Serial Peripheral Interface (SPI) bus, an Inter-Integrated Circuit (I2C) bus, a system management bus (SMBUS), a power management bus (PMBUS), or the like. BMC 980 may be configured to provide out-of-band access to devices at information handling system 900. Out-of-band access in the context of the bus 960 may refer to operations performed prior to execution of firmware 972 by processor 902 to initialize operation of system 900.

Firmware 972 may include instructions executable by processor 902 to initialize and test the hardware components of system 900. For example, the instructions may cause the processor 902 to execute a power-on self-test (POST). The instructions may further cause the processor 902 to load a boot loader or an operating system (OS) from a mass storage device. Firmware 972 additionally may provide an abstraction layer for the hardware, such as a consistent way for application programs and operating systems to interact with the keyboard, display, and other input/output devices. When power is first applied to information handling system 900, the system may begin a sequence of initialization procedures, such as a boot procedure or a secure boot procedure. During the initialization sequence, also referred to as a boot sequence, components of system 900 may be configured and enabled for operation and device drivers may be installed. Device drivers may provide an interface through which other components of the system 900 can communicate with a corresponding device. The firmware 972 may include a basic input-output system (BIOS) and/or include a unified extensible firmware interface (UEFI). Firmware 972 may also include one or more firmware modules of the information handling system. Additionally, configuration settings for the firmware 972 and firmware of the information handling system 900 may be stored in the NVRAM 970. NVRAM 970 may, for example, be a non-volatile firmware memory of the information handling system 900 and may store a firmware memory map namespace 900 of the information handling system. NVRAM 970 may further store one or more container-specific firmware memory map namespaces for one or more containers concurrently executed by the information handling system.

Information handling system 900 may include additional components and additional busses, not shown for clarity. For example, system 900 may include multiple processor cores (either within processor 902 or separately coupled to the chipset 906 or through the PCIe buses 908), audio devices (such as may be coupled to the chipset 906 through one of the PCIe busses 908), or the like. While a particular arrangement of bus technologies and interconnections is illustrated for the purpose of example, one of skill will appreciate that the techniques disclosed herein are applicable to other system architectures. System 900 may include multiple processors and/or redundant bus controllers. In some embodiments, one or more components may be integrated together in an integrated circuit (IC), which is circuitry built on a common substrate. For example, portions of chipset 906 can be integrated within processor 902. Additional components of information handling system 900 may include one or more storage devices that may store machine-executable code, one or more communications ports for communicating with external devices, and various input and output (I/O) devices, such as a keyboard, a mouse, and a video display.

In some embodiments, processor 902 may include multiple processors, such as multiple processing cores for parallel processing by the information handling system 900. For example, the information handling system 900 may include a server comprising multiple processors for parallel processing. In some embodiments, the information handling system 900 may support virtual machine (VM) operation, with multiple virtualized instances of one or more operating systems executed in parallel by the information handling system 900. For example, resources, such as processors or processing cores of the information handling system may be assigned to multiple containerized instances of one or more operating systems of the information handling system 900 executed in parallel. A container may, for example, be a virtual machine executed by the information handling system 900 for execution of an instance of an operating system by the information handling system 900. Thus, for example, multiple users may remotely connect to the information handling system 900, such as in a cloud computing configuration, to utilize resources of the information handling system 900, such as memory, processors, and other hardware, firmware, and software capabilities of the information handling system 900. Parallel execution of multiple containers by the information handling system 900 may allow the information handling system 900 to execute tasks for multiple users in parallel secure virtual environments.

The schematic or flow diagram of FIG. 7 is generally set forth as a logical flow chart diagram, as well as some of the operations described with reference to other drawings, such as FIG. 6. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as adaptive boosting (AdaBoost) or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. 1. A method comprising:
receiving, by a hub device, telemetry data associated with a user during a gaming session for a gaming application executing on the hub device;
monitoring, by the hub device, a gaming performance of the user during the gaming session, based, at least in part, on the telemetry data, wherein the telemetry data includes session data and wellness data associated with the user, wherein the session data is indicative of one or more gaming characteristics of the user during the gaming session, wherein the one or more gaming characteristics include a skill level of the user, and wherein the wellness data is indicative of a mood of the user during the gaming session;
determining that the user needs assistance with at least one portion of the gaming application, based on the monitoring; and
initiating a gaming assistance session to provide the assistance via at least one interface of a device associated with the user, based on the determination and when the skill level of the user is below the threshold skill level and the mood of the user is receptive to gaming assistance.

2. The method of claim 1, wherein the threshold skill level is based on an average skill level of others users with respect to the at least one portion of the gaming application.

3. The method of claim 1, wherein the at least one interface of the device associated with the user includes a display interface of a display device coupled to the hub device, and wherein initiating the gaming assistance session comprises:
displaying a prompt via the display interface of the display device, the prompt requesting confirmation that the user needs the assistance during the gaming session;
receiving a response to the prompt from the device of the user; and
initiating the gaming assistance session as an in-game assistance session via the display interface when the response includes the requested confirmation.

4. The method of claim 3, wherein the at least one interface of the device associated with the user further includes a haptic interface of a peripheral device coupled to the hub device, and wherein initiating the gaming assistance session further comprises triggering haptic feedback via the haptic interface of the peripheral device based on the received response.

5. The method of claim 4, wherein the peripheral device is a wireless game controller coupled to the hub device.

6. An information handling system comprising:
a memory; and
a processor coupled to the memory, wherein the processor is configured to perform operations comprising:
receiving telemetry data associated with a user during a gaming session for a gaming application;
monitoring a gaming performance of the user during the gaming session, based, at least in part, on the telemetry data, wherein the telemetry data includes session data and wellness data associated with the user, wherein the session data is indicative of one or more gaming characteristics of the user during the gaming session, wherein the one or more gaming characteristics include a skill level of the user, and wherein the wellness data is indicative of a mood of the user during the gaming session;
determining that the user needs assistance with at least one portion of the gaming application, based on the monitoring; and
initiating a gaming assistance session to provide the assistance via at least one interface of a device associated with the user, based on the determination and when the skill level of the user is below the threshold skill level and the mood of the user is receptive to gaming assistance.

7. The information handling system of claim 6, wherein the threshold skill level is based on an average skill level of others users with respect to the at least one portion of the gaming application.

8. The information handling system of claim 6, wherein the at least one interface of the device associated with the user includes a display interface of a display device, and wherein initiating the gaming assistance session comprises:
displaying a prompt via the display interface of the display device, the prompt requesting confirmation that the user needs the assistance during the gaming session;
receiving a response to the prompt from the device of the user; and
initiating the gaming assistance session as an in-game assistance session via the display interface when the response includes the requested confirmation.

9. The information handling system of claim 8, wherein the at least one interface of the device associated with the user further includes a haptic interface of a peripheral device associated with the user, and wherein initiating the gaming assistance session further comprises triggering haptic feedback via the haptic interface of the peripheral device based on the received response.

10. The information handling system of claim 9, wherein the peripheral device is a wireless game controller.

11. A computer program product, comprising:
a non-transitory computer readable medium comprising code for performing operations comprising:
receiving telemetry data associated with a user during a gaming session for a gaming application;
monitoring a gaming performance of the user during the gaming session, based, at least in part, on the telemetry data, wherein the telemetry data includes session data and wellness data associated with the user, wherein the session data is indicative of one or more gaming characteristics of the user during the gaming session, wherein the one or more gaming characteristics include a skill level of the user, and wherein the wellness data is indicative of a mood of the user during the gaming session;
determining that the user needs assistance with at least one portion of the gaming application, based on the monitoring; and
initiating a gaming assistance session to provide the assistance via at least one interface of a device associated with the user, based on the determination and when the skill level of the user is below the threshold skill level and the mood of the user is receptive to gaming assistance.

12. The computer program product of claim 11, wherein the threshold skill level is based on an average skill level of others users with respect to the at least one portion of the gaming application.

13. The computer program product of claim 11, wherein the at least one interface of the device associated with the user includes a display interface of a display device, and wherein initiating the gaming assistance session comprises:

displaying a prompt via the display interface of the display device, the prompt requesting confirmation that the user needs the assistance during the gaming session;

receiving a response to the prompt from the device of the user; and initiating the gaming assistance session as an in-game assistance session via the display interface when the response includes the requested confirmation.

14. The computer program product of claim 13, wherein the at least one interface of the device associated with the user further includes a haptic interface of a peripheral device associated with the user, and wherein initiating the gaming assistance session further comprises triggering haptic feedback via the haptic interface of the peripheral device based on the received response.

\* \* \* \* \*